(12) United States Patent
Shasha et al.

(10) Patent No.: US 7,805,703 B2
(45) Date of Patent: Sep. 28, 2010

(54) SYSTEM AND METHOD FOR REPRESENTING THE INTERACTIONS BETWEEN MULTIPLE INPUTS AND AT LEAST ONE OUTPUT

(75) Inventors: Dennis Shasha, New York, NY (US); Rodrigo Gutierrez, New York, NY (US); W. Bradford Paley, New York, NY (US); Christopher Poultney, New York, NY (US); Gloria Coruzzi, New York, NY (US)

(73) Assignee: New York University, New York, NY (US)

( * ) Notice: Subject to any disclaimer, the term of this patent is extended or adjusted under 35 U.S.C. 154(b) by 1157 days.

(21) Appl. No.: 11/303,028

(22) Filed: Dec. 16, 2005

(65) Prior Publication Data
US 2006/0286541 A1     Dec. 21, 2006

Related U.S. Application Data

(60) Provisional application No. 60/637,865, filed on Dec. 22, 2004.

(51) Int. Cl.
*G06F 9/44*     (2006.01)
*G06F 3/048*    (2006.01)
*G05B 15/00*    (2006.01)

(52) U.S. Cl. .................. 717/105; 715/763; 715/771; 715/772; 700/83

(58) Field of Classification Search ................. 717/105
See application file for complete search history.

(56) References Cited

U.S. PATENT DOCUMENTS

| | | | | |
|---|---|---|---|---|
| 5,784,275 A | * | 7/1998 | Sojoodi et al. | 700/86 |
| 6,064,409 A | * | 5/2000 | Thomsen et al. | 715/700 |
| 6,334,099 B1 | * | 12/2001 | Grace et al. | 702/194 |
| 7,137,071 B2 | * | 11/2006 | Fuller et al. | 715/771 |
| 7,484,200 B2 | * | 1/2009 | Joffrain et al. | 717/100 |

* cited by examiner

*Primary Examiner*—Thomas K Pham
(74) *Attorney, Agent, or Firm*—Michael L. Goldman; Stephen M. Hertzler; Nixon Peabody, LLP

(57) ABSTRACT

The invention relates to a system and method for visually representing the interactions of input variables and output variables using a visualization field. The method comprises generating a visualization field on a display device, generating input variable indicators representative of the input variables, positioning the input variable indicators relative to the visualization field, generating interaction indicators, which are indicators of the input variables, positioning the interaction indicators relative to the visualization field, and adjusting the appearance of the interaction indicators to reflect the values of the output variables. The interaction indicators may also comprise association indicators that identify the input variables associated with the interaction indicators.

44 Claims, 6 Drawing Sheets

SYSTEM AND METHOD FOR REPRESENTING THE INTERACTIONS BETWEEN MULTIPLE INPUTS AND AT LEAST ONE OUTPUT

RELATED APPLICATION DATA

This application claims benefit of priority of Provisional Application Ser. No. 60/637,865 filed on Dec. 22, 2004, the entire disclosure of which is incorporated herein by reference.

FIELD OF THE INVENTION

The invention relates to a system and method for representing the interactions between multiple inputs and at least one output.

BACKGROUND OF THE INVENTION

Visualizing data is of vital importance in all aspects of science, commerce, and government. Often results depend on many factors and their interactions.

Experiments are a typical though not the only source of such data. Each experiment in a set of related experiments will share a set of "input" variables or factors and one or more "output" variables. The experimenter has some control over the "input" variables but the system being observed determines how the output variables relate to the inputs.

For example, the inputs to a growing plant system are the nutrients and energy given to the plant such as: carbon level, organic nitrogen level, inorganic nitrogen level, and light level. The output variables might be height of the plant, weight of the plant, or the amount of protein present in the plant after treatment. In this example, the "system" is the growing plant. The system thus determines how the output is related to the input.

Currently, the common visualization method available to show interactions is the Venn diagram. (See FIG. 1). The Venn diagram consists of a collection of either two or three overlapping circles. Suppose there are three circles. Each circle may correspond to an input factor, for example, F1, F2, and F3. The part of the Venn diagram covered by the F1 circle alone corresponds to the experiment when F1 alone is present. The part covered by the F1 and F2 circles but not the F3 circle corresponds to the experiment when F1 and F2. but not F3 are present. The part covered by all three circles corresponds to the experiment when F1, F2, and F3 are present. In short, any combination of F1, F2, and F3 in which at least one is present is captured by some interaction. Thus, a Venn diagram is a visualization tool that can be used for up to three binary variables.

A need exists, therefore, to be able to visually represent the interactions of more than three input factors. This invention answers that need.

SUMMARY OF THE INVENTION

One embodiment of the invention relates to a method for visually representing the interactions of a plurality of input variables and at least one output variable, the method comprising the steps of generating a visualization field on a display device, generating on the display device at least one input variable indicator representative of at least one of the plurality of input variables, positioning each of the input variable indicators relative to the visualization field, generating on the display device at least one interaction indicator, the interaction indicator being an indicator of a combination of at least one input variable, positioning each of the interaction indicators relative to the visualization field, and adjusting the appearance of the interaction indicators on the display device to reflect at least one value of the output variables.

Another embodiment of the invention relates to a system for visually representing the interactions of a plurality of input variables and at least one output variable, the system comprising a visualization field generator that generates a visualization field on a display device, an input variable indicator generator that generates on the display device at least one input variable indicator representative of at least one of the plurality of input variables, an input variable indicator positioner that positions each of the input variable indicators relative to the visualization field, an interaction indicator generator that generates on the display device at least one interaction indicator, the interaction indicator being an indicator of a combination of at least one input variable, an interaction indicator positioner that positions each of the interaction indicators relative to the visualization field, and an interaction indicator adjustor that adjusts the appearance of the interaction indicators on the display device to reflect at least one value of the output variables.

Yet another embodiment of the invention relates to a computer readable medium having instructions stored thereon for visually representing the interactions of a plurality of input variables and at least one output variable, the instructions comprising instructions for generating a visualization field on a display device, instructions for generating on the display device at least one input variable indicator representative of at least one of the plurality of input variables, instructions for positioning each of the input variable indicators relative to the visualization field, instructions for generating on the display device at least one interaction indicator, the interaction indicator being an indicator of a combination of at least one input variable, instructions for positioning each of the interaction indicators relative to the visualization field, and instructions for adjusting the appearance of the interaction indicators on the display device to reflect at least one value of the output variables.

A further embodiment of the invention relates to a display for visually representing the interactions of a plurality of input variables and at least one output variable, the display comprising a visualization field, at least one input variable indicator representative of at least one of the plurality of input variables, and at least one interaction indicator, the interaction indicator being an indicator of a combination of at least one input variable, wherein the input variable indicators and the interaction indicators are positioned relative to the visualization field, and wherein the appearance of the interaction indicators reflects at least one value of the output variables.

Within the scope of these and other embodiments of the invention, the visualization field may be a convex geometric shape, such as an ellipse or a circle. Each of the input variable indicators may be positioned around the edge of the visualization field, and may be positioned in an even distribution around the edge of the visualization field. Also, the appearance of the interaction indicators may be adjusted to reflect at least one value of the output variables comprises adjusting the size or coloration of at least a portion of the interaction indicators.

The interaction indicators may comprise an association indicator operative to identify the at least one input variable associated with the interaction indicators. The association indicator may comprise arrows on the display device extending outwardly from the interaction indicators toward the input variable indicators representative of the at least one input variable associated with the interaction indicators. In the case where the interaction indicators generally have the same shape as the visualization field, the association indicator may comprise the appearance of the portions of the interaction indicators on the display device geometrically corresponding to the positions on the visualization field wherein the input variable indicators representative of the at least one input variable associated with the interaction indicators may be positioned.

The position of the interaction indicators relative to the visualization field may be based on which of the input variable indicators may be representative of the at least one input variable associated with the interaction indicators. For example, the position of the interaction indicators relative to the visualization field may be based on the position of the input variable indicators representative of the at least one input variable associated with the interaction indicators relative to the visualization field.

Furthermore, at least one of the input variable indicators or interaction indicators may be selected, for example, by a user of the invention. In this case, at least one of the interaction indicators associated with the selected input variable indicators may also be selected, or vice versa. The appearance of the selected input variable indicators and the selected interaction indicators may be adjusted to signify their selection. Moreover, several quantities may be associated with the interaction indicators. In this case, the outermost outline of the interaction indicator may correspond to the largest of the several quantities. In addition, non-maximal quantities from the several quantities may be represented by enclosed convex shapes within the interaction indicator. Also, the border between an enclosed shape and a surrounding shape may be indicated by at least one of brightness or color.

DETAILED DESCRIPTION OF THE INVENTION

Figure 1:
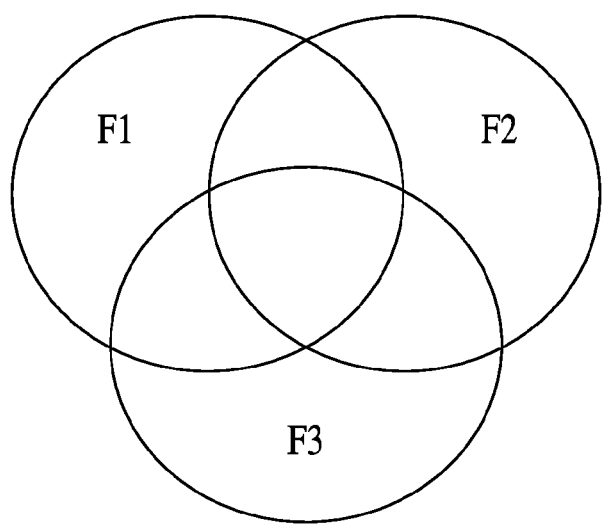
FIG. 1 is an illustration of a Venn diagram.

The term "input factors" refers to the one or more input variables and the term "outputs" refers to the one or more output variables. Each input factor can have at least two values which we will symbolize by 0 and 1 (though the actual values may be different) if there are just two and $0, 1, \ldots, k-1$ if there are $k>2$. The output value can be any positive number. The output value may be normalized (e.g. by adding a value to the real output value) in order to make it positive.

An experiment will consist of some setting of the input variables and result through the activity of the system in some setting of the output variables. For example, an experiment on a plant could have carbon 1, nitrogen 0, and light 1 and result in a plant that grows to 12 centimeters. Another experiment might set the inputs as follows—carbon, nitrogen 1, and light 0—and result in a growth total of 9 centimeters. If there are n input variables, even if they are binary (only values 0 and 1 each), there are $2^n$ possible experimental settings.

The invention is a system and method enabling a user to visually represent the interaction among several input factors. If there are n input factors, the visualization can potentially reveal the results of up to $2^n$ interactions at one time, depending on n and the resolution of the display. The visualization will also enable the user to highlight related subsets of these interactions as we explain below.

The invention is equally useful in situations where there are n binary input factors and a single output and in situations where there are multiple non-binary input factors and multiple outputs.

The method of the invention is not limited by its order of operation. Accordingly, the steps of the method of the invention may be carried out in any order, or may occur simultaneously. Furthermore, the display device for use with the invention includes any type of apparatus operative to display information, for example, a LCD, PDP, CRT, OLED, LED, and the like. In addition, other types of displays include, for example, paper, such as screen printed paper, notebook paper, or computer paper, chalkboards, overhead sheets, photographs, electronic images, and the like.

Binary Input Factors/One Output

Figure 2:
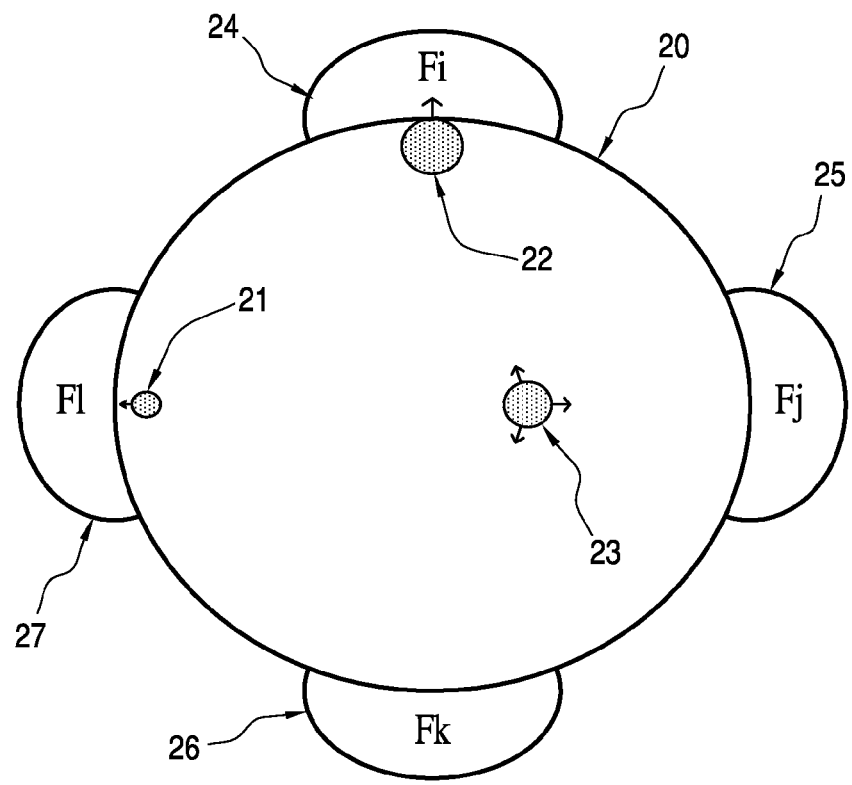
FIG. 2 is an illustration of one embodiment of the invention wherein there are multiple binary input factors, each of which can be either 1 ("on") or 0 ("off").

As shown in FIG. 2, one embodiment of the invention relates to the case where there are n binary input factors, each of which can be either 1 ("on") or 0 ("off"). In this embodiment, input variables indicators 24, 25, 26, and 27 are representative of at least one of the four input factors or input variables Fi, Fj, Fk, and Fl. Each of the input variable indicators are preferably positioned around the perimeter of visualization field 20, which is preferably a convex geometric shape (e.g., a circle or preferably an ellipse) with the input variable indicators being evenly spaced along the perimeter. The order of the input variable indicators around the visualization field may be specified at setup time, for example, by a user.

Interaction indicators 21, 22, and 23 (also known as gears) are positioned relative to visualization field 20, and are preferably positioned within visualization field 20. The interaction indicators are indicators of a combination of at least one input variable. As shown in FIG. 2, each of the interaction indicators has association indicators identifying the input variables associated with the interaction indicators. In this case, the association indicators comprise arrows extending outwardly from the interaction indicators towards the input variable indicators representative of the at least one input variable associated with the interaction indicators. For example, interaction indicator 23 has three association indicators, with each association indicator pointing towards one of input variable indicators 24, 25, and 26. Thus, interaction indicator 23 is an indicator of a combination of input variables Fi, Fj, and Fk, respectively. The arrows extending outwardly from each interaction indicator indicate which input factors the interaction indicator is associated with. For example, interaction indicator 23 has arrows pointing towards inputs Fi, Fj, Fk and corresponds (in size, brightness, or some other feature) to the output when input factors Fi, Fj, and Fk are on and all other input factors are off. An interaction indicator having no association indicators is an indicator of the value of the output when all input variables or input factors are off.

Figure 3:
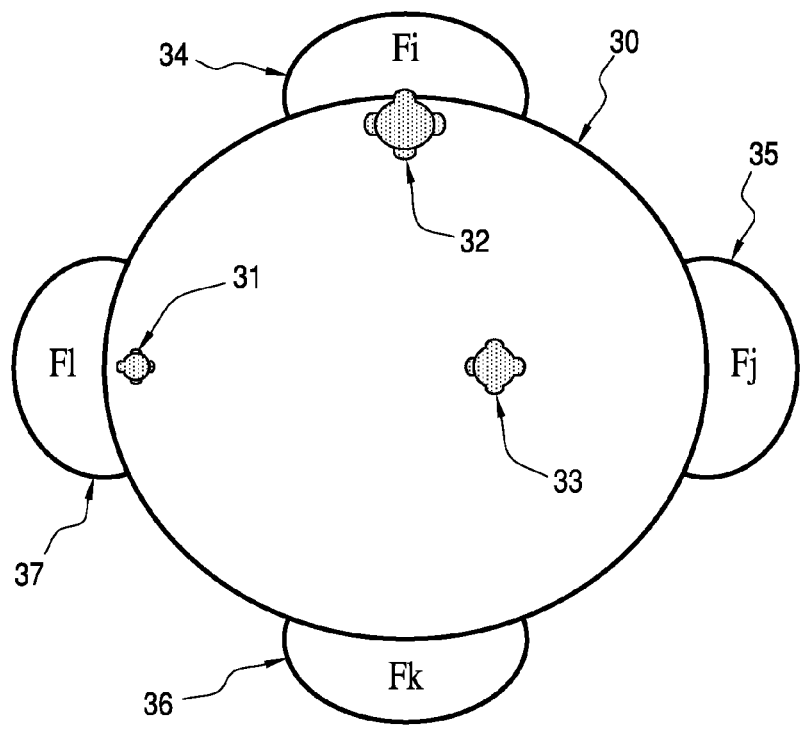
FIG. 3 is an illustration of one embodiment of the invention wherein each of the interaction indicators has geometrical elements around its periphery corresponding to the positions of the input variable indicators around the visualization field.

In an alternative embodiment shown in FIG. 3, instead of arrows, each of the interaction indicators has an association indicator comprising the appearance of the portions of the interaction indicators geometrically corresponding to the portions of the visualization field wherein the input variables indicators are positioned. In this case, the interaction indicators have the same general shape as the visualization field. As shown in FIG. 3, each interaction indicator has n geometrical elements around its periphery corresponding to the positions of the n geometrical elements around the visualization field. For example, each of interaction indicators 31, 32, and 33 has four geometrical elements around its periphery corresponding to the positions of the four input variable indicators 34, 35, 36, and 37 representative of the input variables Fi, Fj, Fk, and Fl, respectively, relative to the visualization field 30. For interaction indicator 33, the top, right, and bottom association indicators are lit up, thus indicating a correspondence with the situation that inputs Fi, Fj, and Fk are on, and input Fl is off. As is evident from the FIG. 3, the top association indicator corresponds to input variable indicator 34, the right association indicator corresponds to input variable indicator 35, and the bottom association indicator corresponds to input variable indicator 36. The left association indicator corresponds to input variable indicator 37, and, because the left association indicator is not lit up, indicates that this interaction indicator corresponds to a situation when input variable Fl is off. Similarly, for interaction indicator 32, only the top geometric element is lit up, thus indicating that input variable Fi is on and input variables Fj, Fk, and Fl are off.

Figure 4:
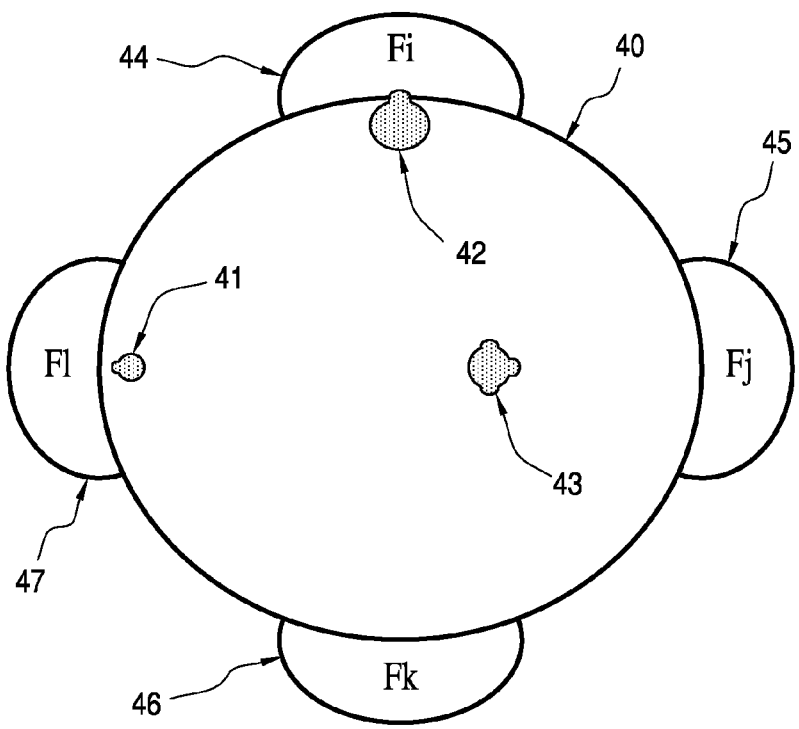
FIG. 4 is an illustration of an alternative embodiment of the invention wherein each of the interaction indicators has geometrical elements around its periphery corresponding to the positions of the input variable indicators around the visualization field.

In a similar embodiment shown in FIG. 4, each of interaction indicators 41, 42, and 43 have association indicators in the form of geometrical elements around their periphery corresponding to the positions of input variable indicators 44, 45, 46, and 47 around visualization field 40, as described above. Input variable indicators 44, 45, 46, and 47 are representative of input variables Fi, Fj, Fk, and Fl, respectively. However, in this embodiment, only the association indicators corresponding to the positions of the input variable indicators representative of the input variables that are on are visible. For example, interaction indicator 43 has three visible association indicators, one on the top, one on the right, and one on the bottom. The visibility of the association indicators around interaction indicator 43 indicates, for this interaction indicator, which inputs are on, specifically, input variables Fi, Fj, and Fk. An association indicator on the left side of interaction indicator 43 corresponding to input variable indicator 47 is not visible because input variable Fl is off. Similarly, for interaction indicator 41, only the left association indicator is visible, thus indicating that only input variable Fl is on, and all of input variables Fi, Fj, and Fk are off, and thus invisible.

In general, each interaction indicator preferably comprises association indicators or some form of a graphical indication of the input variables with which that interaction indicator is associated.

Suppose an interaction indicator is associated with input variables Fi, Fj, and Fk, for example, in FIGS. 2-4. The size of the interaction indicator is preferably proportional to the value of the output variable when input variables Fi, Fj, and Fk are on and all other input factors are off. Alternatively, the coloration of the interaction indicator, such as brightness, is preferably proportional to the value of the output when input variables Fi, Fj, and Fk are on and all other input factors are off. In general, there is preferably some feature associated with the visual appearance of the interaction indicators that reflects at least one value of the output variables.

The position of the center of an interaction indicator associated with input variables $F\_i1, F\_i2, \ldots, F\_ij$ may be computed by averaging the x coordinates of the positions the input variable indicators representative of input variables $F\_i1, F\_i2, \ldots, F\_ij$ and averaging the y coordinates of those same input variable indicators. If an interaction indicator has no input variables associated with it, then it is placed in the center of the visualization. If several interaction indicators overlap by this calculation, then their positions relative to the visualization field are "perturbed," and they are moved to nearby positions where they don't overlap. There are many ways to do this, for example, to draw a circle around the shared center point and put the interaction indicators on the periphery of that circle.

Figure 5:
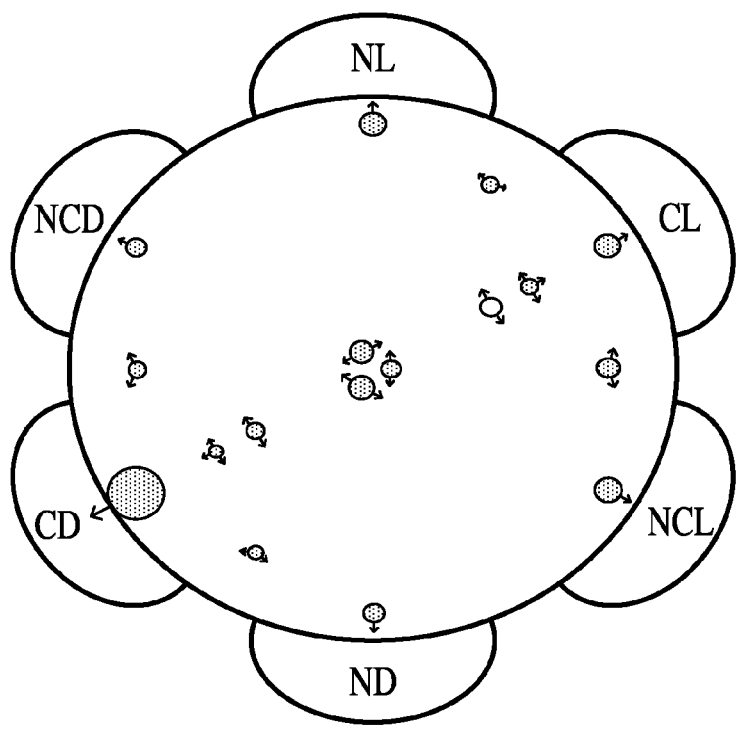
FIG. 5 is an illustration of one embodiment of the invention wherein the position of the center of an interaction indicator associated with the input variable indicators is computed by averaging the x coordinates of the positions of the input variable indicators and averaging the y coordinates of those same factors.
Figure 6:
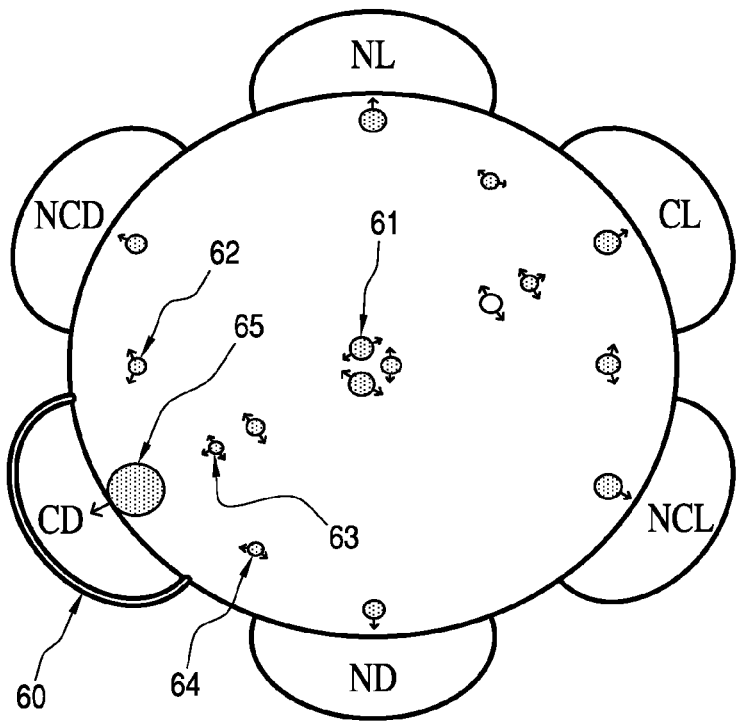
FIG. 6 is an illustration of one embodiment of the invention wherein, when the user clicks on an input variable indicator, then that factor and all interaction indicators pointing to that factor are highlighted in a specific color.

FIGS. 5 and 6 illustrate an embodiment of the invention having six input variable indicators representative of input variables NL, CL, NCL, ND, CD, and NCD, respectively. As is apparent from FIGS. 5 and 6, the invention can be utilized to display the interactions of large numbers of inputs and outputs.

As shown in FIG. 6, one or more input variable indicators may be selected. In this example, input variable indicator 60, which is representative of input variable DC, is selected. When one or more input variable indicators are selected, one or more of the interaction indicators associated with the input variables represented by the selected input variable indicators may also be selected, preferably automatically. As shown in FIG. 6, interaction indicators 61, 62, 63, 64, and 65 are all associated with input variable CD, as is evidenced by the association indicators of the interaction indicators. Thus, one or more of interaction indicators 61, 62, 63, 64, and 65 may also be selected, preferably automatically.

Figure 7:
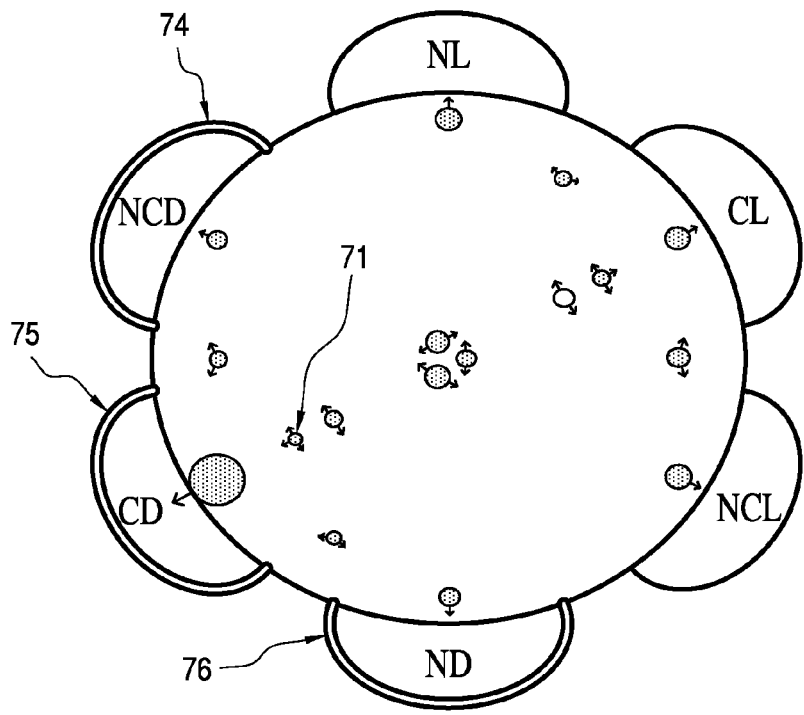
FIG. 7 is an illustration of one embodiment of the invention wherein, when the user clicks on an interaction indicator, then the interaction indicator and all input variable indicators it points to light up.

Similarly, as shown in FIG. 7, one or more interaction indicators may be selected. In this example, interaction indicator 71 is selected. When one or more interaction indicators are selected, one or more of the input variable indicators representative of the input variables associated with the selected interaction indicators may also be selected, preferably automatically. As shown in FIG. 7, interaction indicator 71 is associated with input variables NCD, CD, and ND, as is evidenced by interaction indicator 71's association indicators. Thus, one or more of input variable indicators 74, 75, and 76, which are representative of input variables NCD, CD, and ND, respectively, may also be selected, preferably automatically.

In addition, when one or more input variable indicators or interaction indicators are selected, the appearance of the selected indicators is preferably adjusted to signify their selection. For example, in FIG. 6, the appearance of input variable indicator 60 and interaction indicators 61, 62, 63, 64, and 65 would preferably be adjusted to reflect their selection. Furthermore, in FIG. 7, the appearance of interaction indicator 71 and input variable indicators 74, 75, and 76 would preferably adjusted to reflect their selection. This adjustment can include changing the color of the selected indicators, or any other visual or graphical adjustment. By using several different appearance adjustment techniques, for example, different colors, multiple selections could be done simultaneously, each showing its interaction indicators and input variable indicators in a different manner.

Non-binary Input Factors

The invention also relates to visual representation of the interactions of non-binary inputs and outputs. For example, suppose input variable F is non-binary and has k possible values 0, 1, ..., k−1. The present invention uses two techniques to handle F.

Replacement

Figure 8:
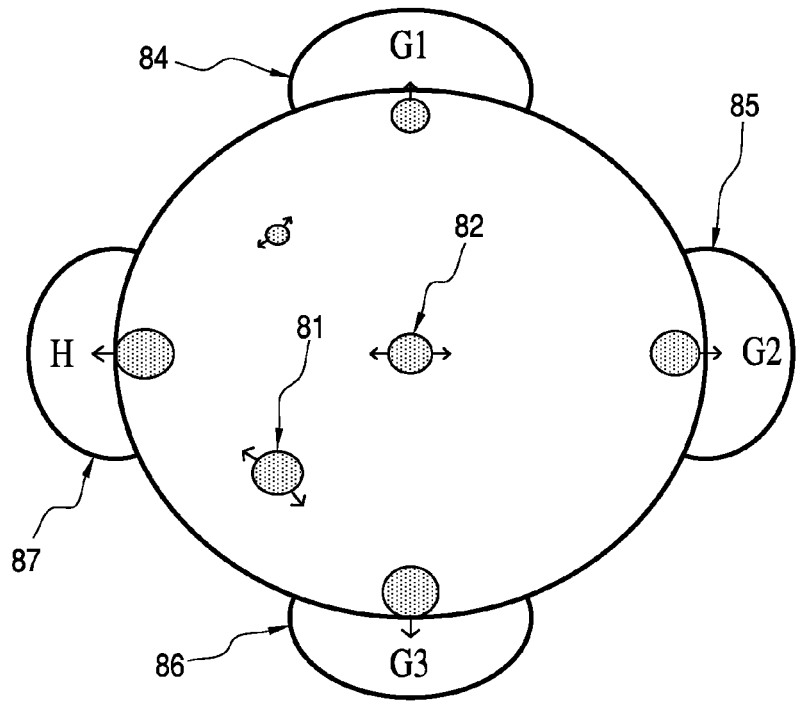
FIG. 8 is an illustration of the replacement technique of the invention.

The first technique is to substitute k−1 binary factors $G\_1, G\_2, G\_3, \ldots, G\_k-1$ for non-binary input variable F, where the factor $G\_i$ has the value 1 when F is set to 1 and is 0 otherwise, and then generating and positioning an input variable indicator relative to a visualization field for each of the k−1 binary factors, $G\_1, G\_2, G\_3, \ldots, G\_k-1$. In this way, the effect of several possible settings of input variable F can be revealed simultaneously. The replacement could be less drastic, e.g. replacing input variable F by fewer factors, some of which may be non-binary. For example, suppose input variable F can take values 0, 1, 2, 3. A substitution can be made for non-binary input variable F in the form of binary input variables G1, G2, G3. A second input variable H is a binary input. Table 1 below shows a possible specification. Thus, if input variable F has a value of 0, none of input variables G1, G2, or G3 will be on. This example is shown in FIG. 8, wherein input variable indicators 84, 85, and 86 represent input variables G1, G2, and G3, respectively. Input variable indicator 87 represents input variable H. As is shown in FIG. 8, interaction indicator 81 has association indicators indicating that it is associated with input variables H and G3. That is, interaction indicator 81 corresponds to the situation in which input variable H is on and input variable F has a value of 3, which is the value of input variable F corresponding to input variable G3. Accordingly, for the specification set forth in Table 1, the value of the output for interaction indicator 81 is 20, and is represented by the appearance, for example, the size, of interaction indicator 81. Similarly, interaction indicator 82 has input variables H and G2 on. Thus, input variable F has a value of 2. Therefore the value of the output for interaction indicator 82 is 15. Accordingly, interaction indicator 82 has a different appearance than interaction indicator 81, for example, interaction indicator 82 is slightly smaller in size than interaction indicator 81, to reflect the different value of the output.

TABLE 1

| G1 | G2 | G3 | H | Out |
|---|---|---|---|---|
| 1 | 0 | 0 | 0 | 10 |
| 0 | 1 | 0 | 0 | 20 |
| 0 | 0 | 1 | 0 | 30 |
| 0 | 0 | 0 | 1 | 30 |
| 1 | 0 | 0 | 1 | 5 |
| 0 | 1 | 0 | 1 | 15 |
| 0 | 0 | 1 | 1 | 20 |

Radio Selection

If, after all desired replacements have taken place, there remains a non-binary input variable H, the user interface will permit the user to select some value for input variable H, say value v. At that point, the visualization shows the interaction indicators when input variable H has value v (i.e., H=v signifies "on") and H=0 signifies off. In a similar embodiment, the visualization shows the interaction indicators when H can take any value greater than or equal to value v (i.e., H>=v) signifies "on" and any value where H is less than value v (H<v) signifies "off." A further embodiment differs only in that H=0 can signify that input variable H if "off."

Figure 9:
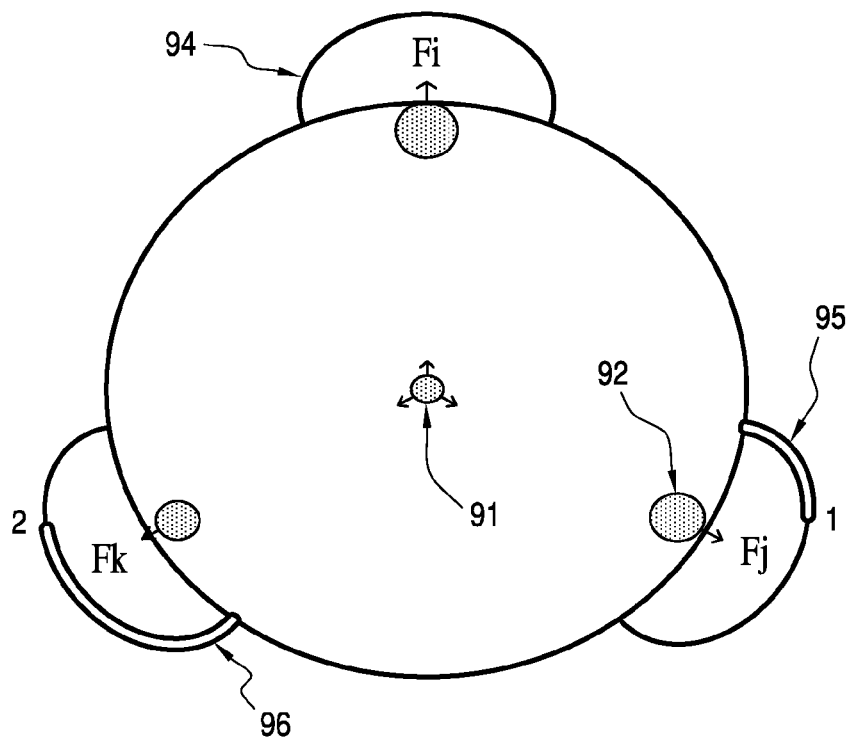
FIG. 9 is an illustration of the radio selection technique of the invention.

For example, as is shown in FIG. 9, suppose input variable Fi is binary, and the particular radio selections for input variables Fj and Fk are indicated near to their position, specifically, that input variable Fj has a cutoff value of 1 wherein a value less than 1 results in input variable Fj being off and that Fk has a cutoff value of two wherein a value less than two results in input variable Fk being off. Thus, interaction indicator 91 is associated with input variable Fi being on, input variable Fj having a value of greater than or equal to 1, and input variable Fk having a value of greater than or equal to two. Similarly, interaction indicator 92 is associated with input variable Fj being greater than or equal to 1, input variable Fi being off, and input variable Fk being less than 2.

Multiple Outputs

Figure 10:
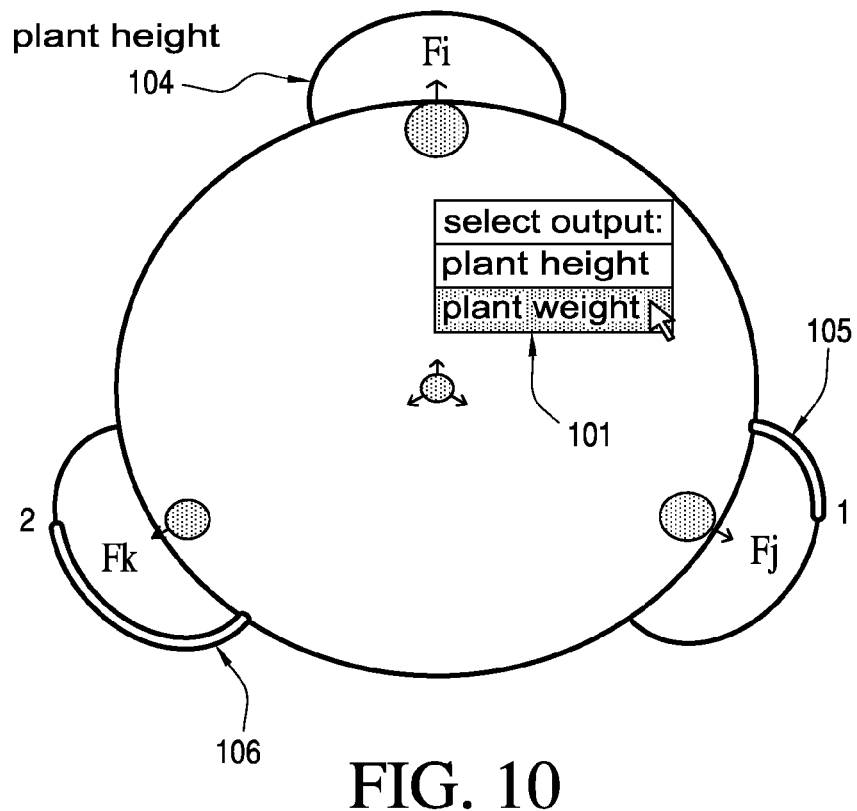
FIG. 10 is an illustration of one embodiment of the invention wherein there is a menu of possible outputs somewhere in the visualization.

As shown in FIG. 10, the system of the present invention also preferably comprises a menu 101 of possible classes of outputs accessible from the display device. Using menu 101, it is possible for a user to select a particular output to display in the visualization. In response, the visualization is updated to display the existing visualization field, input variable indicators, and interaction indicators with respect to the values for that output. For example, suppose the input variables are carbon, light, organic nitrogen, and inorganic nitrogen, and the output variables are plant height and plant weight. Then plant height will be one item on menu 101 and plant weight the other. If plant height is chosen, then the visualization is set up based on plant height. Thus, the appearance of the interaction indicators will reflect the values of the output variables for plant height. If plant weight is chosen, then the visualization is set up based on plant weight and the appearance of the interaction indicators will reflect the values of the output variables for plant weight.

Specifying Input Data and Pseudo-code to Process Input Data

The visualization of the invention is described by forming rows consisting of values of input variables and the associated output variables. When there are several output variables, there is a separate table for each, to handle the case when some experiments measured one output value but not the other. There are many equivalent embodiments of such information that would be well known to one skilled in the art (for example, the different tables could be merged into one table perhaps with added columns).

Multi-magnitude Representation

The visualization of the invention represents magnitude of output variables by the appearances of an interaction indicator, such as size, intensity, color or some combination of these. Sometimes, a given interaction indicator is associated with several magnitudes of output variables depending on other selections that have been made. In that case, it is of interest to be able to indicate those different magnitudes in a single visualization. This is called a multi-magnitude representation.

For example, suppose there are several quantities $q1, q2, \ldots, qk$ of output variables all associated with an interaction indicator. Suppose further that they are in ascending order of magnitude so $q1<q2<\ldots<qk$. In one embodiment, the size of the periphery of the interaction indicator could be based on the quantity qk (the largest quantity). Within that shape, enclosed convex shapes would delineate increasingly smaller areas each related to the quantity it corresponds to. In this embodiment, the successfully smaller shapes would be distinguished by color or brightness. The generally concentric arrangement of the different shapes serves to distinguish between the different magnitudes for each output represented by the appearance of the interaction indicator.

Figure 11:
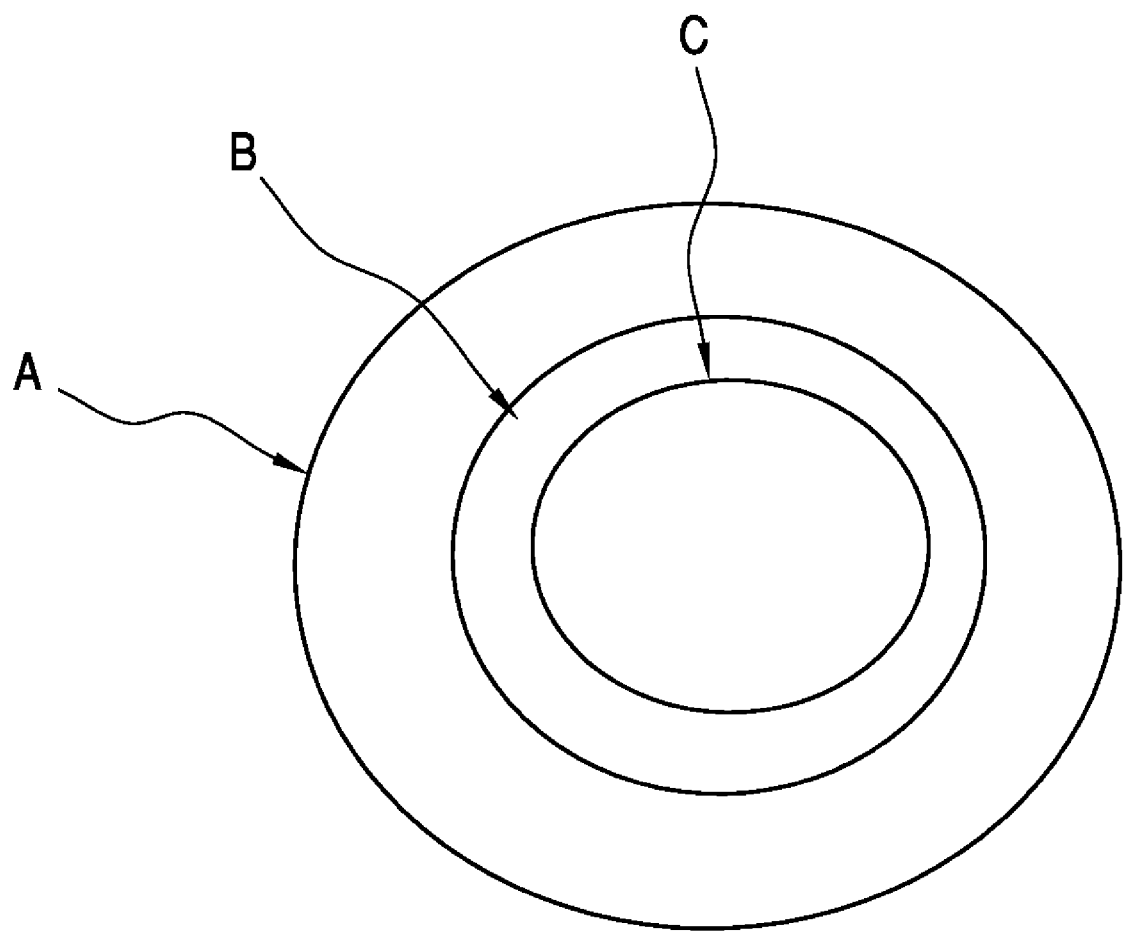
FIG. 11 is an illustration of one embodiment of the invention wherein multiple output values are represented by a single interaction indicator.

For example, in FIG. 11, three different magnitudes of outputs are represented by shapes A, B, and C. The value of the output represented by circle A is the largest, while the value of the output represented by inscribed circle C is the smallest. The different values can be distinguished based on brightness, for example. In this case, circle A could be brightest, then B, then C. Alternatively the different magnitudes could be represented by three different colors, or by some other adjustment to their appearance, such as highlighting.

A typical use of this multi-magnitude representation occurs when the visualization of the invention illustrates the result of a query. Given a data set, a query engine allows a user to select a portion of that data set through one or more queries. In a preferred embodiment, one or more queries on a data set will result in a set of interaction indicators in a multi-magnitude representation. The outermost outlines of each interaction indicator will correspond to the quantity associated with that interaction indicator in the full data set. Other enclosed circles for each interaction indicator will correspond to the data set following one or more queries. If a query reduced the quantity associated with an interaction indicator to zero, then the interaction indicator may either disappear or appear with its original outline, but still be distinguishable from its initial state.

Queries may be done in any language or even by clicking on parts of the visualization field or on accompanying lists. A typical database language is the SQL language. The details of the query language do not matter.

In one embodiment, the quantity associated with an interaction indicator is the number of elements from the data set associated with that interaction indicator. If a query reduces that number, then an enclosed convex shape will appear within that interaction indicator. This can happen to several interaction indicators all at once.

Table 2 shows a plant example, wherein carbon, inorganic nitrogen, organic nitrogen, and light are inputs, and plant height is the output. Thus, for example, if the input variables for Carbon and Organic Nitrogen are "on" and the input variables for Inorganic Nitrogen and Light are "off," the value of the output variable for Plant Height will be 8.

TABLE 2

| Carbon | Inorganic Nitrogen | Organic Nitrogen | Light | Plant Height |
|---|---|---|---|---|
| 0 | 0 | 0 | 0 | 4 |
| 1 | 0 | 0 | 0 | 6 |
| 0 | 1 | 0 | 0 | 5 |
| 0 | 0 | 1 | 0 | 5 |
| 0 | 0 | 0 | 1 | 8 |
| 1 | 1 | 0 | 0 | 6 |
| 1 | 0 | 1 | 0 | 8 |
| 1 | 0 | 0 | 1 | 6 |
| 0 | 1 | 1 | 0 | 6 |
| 0 | 1 | 0 | 1 | 6 |
| 0 | 0 | 1 | 1 | 7 |
| 1 | 0 | 1 | 1 | 9 |
| 1 | 1 | 0 | 1 | 17 |
| 0 | 1 | 1 | 1 | 11 |
| 1 | 1 | 1 | 0 | 8 |
| 1 | 1 | 1 | 1 | 14 |

Table 3 shows an abstract example that was the specification for the three kinds of plots that generated FIGS. 2, 3, and 4. If there is no row corresponding to a certain combination, then there will be no interaction indicator for that combination. For example, the interaction indicator associated with the combination of inputs wherein input variable Fi is "on" and the other input variables are "off" will have an appearance reflective of the magnitude of the output variable for that combination, specifically, 100.

TABLE 3

| Fi | Fj | Fk | Fl | Out |
|---|---|---|---|---|
| 1 | 0 | 0 | 0 | 100 |
| 0 | 1 | 0 | 0 | 0 |
| 0 | 0 | 1 | 0 | 0 |
| 0 | 0 | 0 | 1 | 25 |
| 1 | 1 | 1 | 0 | 50 |

The method of the invention related to the creation of the visualization described herein can be, for example, carried out according to one embodiment as follows:

```
data:
    A1...n: set of input variable
    V1...m: set of subsets of A, each subset having an
        associated "count"
initialize visualization:
    position input variable indicators at equidistant locations
        around outside of visualization field
    position each interaction indicator in the interior of the
        circle at a position calculated by averaging the
        positions of its input variable indicators
    size each interaction indicator according its count after all
        interaction indicators have been placed, perturb the
        positions of interaction indicators sharing a position so that
        they no longer overlap; if the count changes use a multi-
        magnitude representation
event loop:
    determine selected input variable indicator or interaction
        indicator, if any
    draw the visualization field
    draw each input variable indicator at its position outside the
        visualization field
    if an input variable indicator is selected or an interaction
        indicator referring to it is selected, draw the input
        variable indicator in a highlighted color, else draw
        the input variable indicator in the regular color
    draw each interaction indicator at its size and position
        inside the visualization field with arrows or tabs
        indicating its input variable indicator
    if interaction indicator or an input variable indicator the
        interaction indicator refers to is selected, draw
        interaction indicator and tabs in a highlighted color,
        else draw the interaction indicator and tabs in the
        regular color
```

Thus, the invention relates to a system and method for visually representing the interactions of a plurality of input variables and at least one output variable, the method comprising the steps of generating a visualization field on a display device, generating on the display device at least one input variable indicator representative of at least one of the plurality of input variables, positioning each of the input variable indicators relative to the visualization field, generating on the display device at least one interaction indicator, the interaction indicator being an indicator of a combination of at least one input variable, positioning each of the interaction indicators relative to the visualization field, and adjusting the appearance of the interaction indicators on the display device to reflect at least one value of the output variables. In addition, the appearance of the interaction indicators may be adjusted to reflect at least one value of the output variables by adjusting the size or coloration of at least a portion of the interaction indicators. Furthermore, the interaction indicators may comprise an association indicator operative to identify the at least one input variable associated with the interaction indicators. Moreover, the position of the interaction indicators relative to the visualization field may be based on which of the input variable indicators may be representative of the at least one input variable associated with the interaction indicators.

While the invention has been described with particular reference to the preferred embodiments, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, and it is therefore contemplated that other modifications and applications will occur to those skilled in the art. It is accordingly intended that the claims shall cover all modifications and applications as do not depart from the spirit and scope of the invention.

What is claimed is:

1. A method for visually representing the interactions of a plurality of input variables and at least one output variable, the method comprising the steps of:
   generating a visualization field on a display device, said visualization field including a peripheral line extending around said visualization field;
   generating on said display device a plurality of input variable indicators representative of at least one of the plurality of input variables;
   positioning each of said input variable indicators approximately on the peripheral line of said visualization field;
   generating on said display device at least one interaction indicator, said interaction indicator being an indicator of a combination of at least one input variable, wherein each interaction indicator includes at least one association indicator which graphically identifies, within the visualization field, at least one of the input variables associated with said interaction indicator;
   positioning each of said interaction indicators within the periphery of said visualization field; and
   adjusting the appearance of said at least one interaction indicator on said display device to reflect at least one value of said at least one output variable.

2. The method of claim 1, wherein the position of each said interaction indicator within the periphery of said visualization field is based on which of said input variable indicators are representative of the at least one input variable associated with said interaction indicator.

3. The method of claim 1, wherein the step of adjusting the appearance of each said interaction indicator on said display device to reflect at least one value of the output variables comprises adjusting the size of at least a portion of said interaction indicator.

4. The method of claim 1, further comprising the step of selecting at least one of said input variable indicators.

5. The method of claim 1, further comprising the step of selecting at least one of said interaction indicators.

6. The method of claim 1, wherein at least one input variable is binary.

7. The method of claim 6, wherein at least one input variable is a non-binary input variable, and wherein a plurality of binary inputs are substituted for the at least one non-binary input, each representing a binary indicator if the at least one non-binary input achieves a particular value associated with the binary input.

8. The method of claim 7, wherein at least one non-binary input does not get a substitution with one or more binary inputs, and wherein a radio selection is provided for the at least one non-binary input.

9. The method of claim 8, wherein the radio selection provides the ability to select a particular value of the at least one non-binary input variable for display.

10. The method of claim 1, wherein a multi-magnitude display is presented of a plurality of values of output variables as concentric enclosed shapes whose size varies in proportion to the value of the output variable.

11. The method of claim 1, wherein the position of at least one of said association indicators relative to said interaction indicator identifies an input variable associated with said interaction indicator.

12. A system for visually representing the interactions of a plurality of input variables and at least one output variable, the system comprising:
    a visualization field generator that generates a visualization field on a display device, said visualization field including a peripheral line extending around said visualization field;
    an input variable indicator generator that generates on said display device a plurality of input variable indicators representative of at least one of the plurality of input variables;
    an input variable indicator positioner that positions each of said input variable indicators approximately on the peripheral line of said visualization field;
    an interaction indicator generator that generates on said display device at least one interaction indicator, said interaction indicator being an indicator of a combination of at least one input variable, wherein each interaction indicator includes at least one association indicator which graphically identifies, within the visualization field, at least one of the input variables associated with said interaction indicator;
    an interaction indicator positioner that positions each of said interaction indicators within the periphery of said visualization field; and
    an interaction indicator adjustor that adjusts the appearance of said interaction indicators on said display device to reflect at least one value of the output variables.

13. The system of claim 12, wherein the position of each said interaction indicator within the periphery of said visualization field is based on which of said input variable indicators are representative of the at least one input variable associated with said interaction indicator.

14. The system of claim 12, wherein said interaction indicator adjustor adjusts the size of at least a portion of said interaction indicator.

15. The system of claim 12, further comprising an input variable indicator selector operative to select at least one of said input variable indicators.

16. The system of claim 12, further comprising an interaction indicator selector operative to select at least one of said interaction indicators.

17. The system of claim 12, wherein at least one input variable is binary.

18. The system of claim 17, wherein at least one input variable is a non-binary input variable, and wherein a plurality of binary inputs are substituted for the at least one non-binary input, each representing a binary indicator if the at least one non-binary input achieves a particular value associated with the binary input.

19. The system of claim 18, wherein at least one non-binary input does not get a substitution with one or more binary inputs, and wherein a radio selection is provided for the at least one non-binary input.

20. The system of claim 19, wherein the radio selection provides the ability to select a particular value of the at least one non-binary input variable for display.

21. The system of claim 12, wherein a multi-magnitude display is presented of a plurality of values of output variables as concentric enclosed shapes whose size varies in proportion to the value of the output variable.

22. The system of claim 12, wherein the position of at least one of said association indicators relative to said interaction indicator identifies an input variable associated with said interaction indicator.

23. A computer readable medium having instructions stored thereon for visually representing the interactions of a plurality of input variables and at least one output variable, the instructions comprising:
   instructions for generating a visualization field on a display device, said visualization field including a peripheral line extending around said visualization field;
   instructions for generating on said display device a plurality of input variable indicators representative of at least one of the plurality of input variables;
   instructions for positioning each of said input variable indicators approximately on the peripheral line of said visualization field;
   instructions for generating on said display device at least one interaction indicator, said interaction indicator being an indicator of a combination of at least one input variable,
wherein each interaction indicator includes at least one association indicator which graphically identifies, within the visualization field, at least one of the input variables associated with said interaction indicator;
   instructions for positioning each of said interaction indicators within the periphery of said visualization field; and
   instructions for adjusting the appearance of said interaction indicators on said display device to reflect at least one value of the output variables.

24. The computer readable medium of claim 23, wherein the position of said interaction indicator within the periphery of said visualization field is based on which of said input variable indicators are representative of the at least one input variable associated with said interaction indicator.

25. The computer readable medium of claim 23, wherein the instructions for adjusting the appearance of each said interaction indicator on said display device to reflect at least one value of the output variables comprise adjusting the size of at least a portion of said interaction indicator.

26. The computer readable medium of claim 23, further comprising instructions for selecting at least one of said input variable indicators.

27. The computer readable medium of claim 23, further comprising instructions for selecting at least one of said interaction indicators.

28. The computer readable medium of claim 23, wherein at least one input variable is binary.

29. The computer readable medium of claim 28, wherein at least one input variable is a non-binary input variable, and wherein a plurality of binary inputs are substituted for the at least one non-binary input, each representing a binary indicator if the at least one non-binary input achieves a particular value associated with the binary input.

30. The computer readable medium of claim 29, wherein at least one non-binary input does not get a substitution with one or more binary inputs, and wherein a radio selection is provided for the at least one non-binary input.

31. The computer readable medium of claim 30, wherein the radio selection provides the ability to select a particular value of the at least one non-binary input variable for display.

32. The computer readable medium of claim 23, wherein a multi-magnitude display is presented of a plurality of values of output variables as concentric enclosed shapes whose size varies in proportion to the value of the output variable.

33. The computer readable medium of claim 23, wherein the position of at least one of said association indicators relative to said interaction indicator identifies an input variable associated with said interaction indicator.

34. A display for visually representing the interactions of a plurality of input variables and at least one output variable on a computing device, the display comprising:
   a visualization field, said visualization field including a peripheral line extending around said visualization field;
   a plurality of input variable indicators representative of at least one of the plurality of input variables; and
   at least one interaction indicator, said interaction indicator being an indicator of a combination of at least one input variable, wherein each interaction indicator includes at least one association indicator which graphically identifies, within the visualization field, at least one of the input variables associated with said interaction indicator,
   wherein said input variable indicators are positioned approximately on the peripheral line of said visualization field;
   wherein said interaction indicators are positioned within the periphery of said visualization field, and
   wherein the appearance of said interaction indicators reflects at least one value of the output variables.

35. The display of claim 34, wherein the position of each said interaction indicator within the periphery of said visualization field is based on which of said input variable indicators are representative of the at least one input variable associated with said interaction indicator.

36. The display of claim 34, wherein the size of at least a portion of said interaction indicators reflects at least one value of the output variables.

37. The display of claim 34, wherein at least one of said input variable indicators is selected.

38. The display of claim 34, wherein at least one of said interaction indicators is selected.

39. The display of claim 34, wherein at least one input variable is binary.

40. The display of claim 39, wherein at least one input variable is a non-binary input variable, and wherein a plurality of binary inputs are substituted for the at least one non-binary input, each representing a binary indicator if the at least one non-binary input achieves a particular value associated with the binary input.

41. The display of claim 40, wherein at least one non-binary input does not get a substitution with one or more binary inputs, and wherein a radio selection is provided for the at least one non-binary input.

42. The display of claim 41, wherein the radio selection provides the ability to select a particular value of the at least one non-binary input variable for display.

43. The display of claim 34, wherein a multi-magnitude display is presented of a plurality of values of output variables as concentric enclosed shapes whose size varies in proportion to the value of the output variable.

44. The display of claim 34, wherein the position of at least one of said association indicators relative to said interaction indicator identifies an input variable associated with said interaction indicator.

* * * * *